June 19, 1934.  J. L. HODGSON  1,963,904
ROTARY GAS FLOW METER
Filed Nov. 27, 1931  3 Sheets-Sheet 1

Inventor
John L. Hodgson.
By his Attorneys
Baldwin Wight

June 19, 1934.  J. L. HODGSON  1,963,904
ROTARY GAS FLOW METER
Filed Nov. 27, 1931  3 Sheets-Sheet 3

Inventor
John L. Hodgson
By his attorneys,
Baldwin Wight

Patented June 19, 1934

1,963,904

UNITED STATES PATENT OFFICE 1,963,904

ROTARY GAS FLOW METER

John Lawrence Hodgson, Luton, England, assignor to George Kent, Limited, London, England Application November 27, 1931, Serial No. 577,657
In Great Britain June 9, 1931

2 Claims. (Cl. 73—37)

This invention relates to improvements in rotary gas flow meters and more especially to meters in which the counter is operated by a turbine which is responsive to the flow of gas and the speed of which is damped by liquid of approximately constant density. With this type of meter a 1% change in the density (or absolute pressure) of the gas passing the metering point causes substantially a ½% instead of a 1% change in the weight flow indicated.

In such a meter the law relating the true flow $Q$ in weights units through the meter with the registration $N$ of a counter geared to the turbine so as to give the flow correct for a particularly density $W_1$ of gas, when gas is passed of a variable density $W$, the peripheral speed of the turbine being small compared with the velocity of the driving jets of gas, may be expressed by the formula $$Q = \int \sqrt{\frac{W}{W_1}} dN$$

In this formula $$\sqrt{\frac{W}{W_1}}$$

is a "corrective factor" which varies with the density of the gas and is therefore a function of the pressure, if the temperature and composition of the gas be assumed constant.

Thus the speed of the turbine varies inversely as the square root of the density instead of inversely as the density, as in the case of other rotary meters.

The main object of the present invention is to provide means which enable such a meter to give a diagram from which can readily be ascertained values of corrective factors derived from the pressure of the gas during the period over which the flow is metered, so that it is necessary merely to ascertain the average corrective factor registered for any given time on the chart in order to correct the flow which has passed during that time for any variations in pressure (and thus in the density) which have occurred.

In carrying out the invention a chart is rotated by the turbine through a reduction gear, and the position of a pen or other tracing point on the chart is determined by a Bourdon tube or its equivalent actuated by the pressure of the gas.

The charts may conveniently be marked so that the position of the tracing point indicates the corrective factor by which the registration on a counter should be multiplied when gas of that pressure is passing in the main.

The invention is illustrated in the accompanying drawings in which,—

Figure 1:
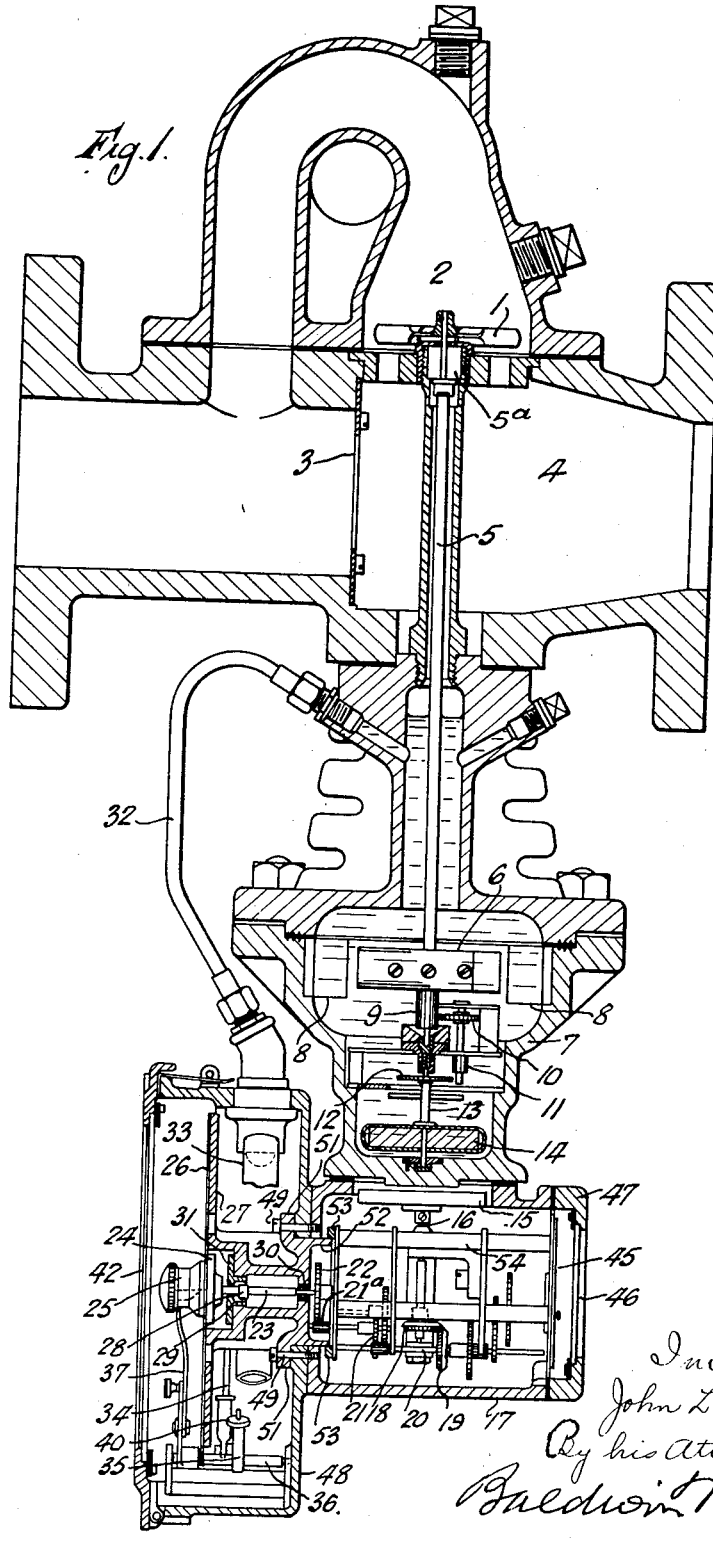
Figure 1 is a longitudinal section and Figure 2 a part side elevation and Figure 3 an elevation of the face of the pressure diagram side of the apparatus.

In one form of construction 1 is the turbine located at the entry of a conduit 2 mounted in shunt across an orifice plate 3 mounted in the main gas flow line 4; the turbine is fast on one end of a spindle 5 which is provided with a damping fan 6 located in a damping chamber 7 provided with damping vanes 8 and filled with a damping liquid; the damping liquid in cases where the meter is used in measuring steam flows is preferably water maintained by the condensation of steam. The other end of the spindle is provided with a pinion 9 in mesh with the first gear wheel 10 of a reduction train 11 the last gear wheel of which is in mesh with a gear wheel 12 fast on a second spindle 13 mounted coaxially with respect to the turbine spindle 5. This second spindle 13 is provided with a magnet 14 for transmitting the drive through the meter casing to a second magnet 15 which is located outside the casing and is fast with a third spindle 16 mounted in a counter casing 17 and provided with a bevel gear 18 in mesh with a second bevel gear 19 secured to a fourth spindle 20. This fourth spindle 20 transmits the drive through a counter reduction gear train indicated generally at 21 to a pinion 21a which meshes with a gear wheel 22 secured to the inner end of a chart spindle 23 provided at its outer end with a head 24 and a clamping nut 25 by means of which a chart 26 can be clamped in position against the head, a chart plate 27 providing a supporting backing for the chart. This chart spindle 23 is provided near its outer or clamp end with a shoulder 28 co-operating with a thrust ball race 29 and is lightly supported at its inner end at 30 so that the friction of the spinner end as a whole is as light as possible and yet the spindle will withstand somewhat rough handling at the end adjacent the clamp end, the outer race of the ball thrust bearing being found by a sleeve 31 which is housed in the chart plate.

The upper end of the spindle 5 extends through a bushing 5a, sufficient clearance being provided between the spindle and bushing to permit pressure fluid to pass downwardly from the chamber 2 to the damping chamber 7 or an extension thereof, and the damping chamber or extension thereof is placed in communication through a pipe 32 with a Bourdon tube 33 which is thereby subjected to the pressure of the gas whose flow is being metered. One end of the tube is anchored in the usual way and the other end is connected by a link 34 to a crank arm 35 on a spindle 36 having an arm 37 carrying a marking device such as a pin 38, the link being adjustable to provide a zero adjustment for the arm 37.

In order to enable a scale adjustment to be made the arm 35 is preferably adjustable and this is effected as shown by forming the arm 35 as a split plate and by providing a screw operable wedge 39 which is introduced in the split plate and can be operated by a nut 40 to vary the distance between the pivotal connection of the link and the axis of the spindle. In order to enable this scale adjustment readily to be made the chart plate 27 is suitably cut away as indicated at 41 and there is provided a glazed door 42 which can be opened to provide access to the adjusting nut 40 and also to enable the chart 26 to be removed and replaced. The chart plate 27 is also provided with an aperture 43 to provide access to a screw 44 forming the pivotal connection between the Bourdon tube 33 and the link 34.

The reduction gear train 21 driven by the fourth spindle 20 drives the counting mechanism indicated generally at 45 which is calibrated in thousands of pounds, the indication being visible through a glass panel 46 inserted in a cover plate 47 secured to that end of the counter casing 17 remote from the chart.

Preferably the chart operating mechanism is mounted in a casing 48 which is secured to the counter casing 17 by screws 49 to which access can be had by further apertures 50 formed in the chart plate 27. The screws pass through apertures in a flange 51 formed on an extension of the chart plate 27 this flange also being bored to receive the bearing for the inner end of the chart spindle 23, the arrangement of the chart plate supporting both the inner and outer bearings for the chart spindle rendering the counter casing dust-proof. In order to enable the counter mechanism to be correctly aligned with respect to the chart spindle 23 the flange 51 on the inner end of the chart plate 27 is provided with a circular extension 52 which registers with a ring 53 secured to the framework 54 of the counter mechanism.

Figure 4:
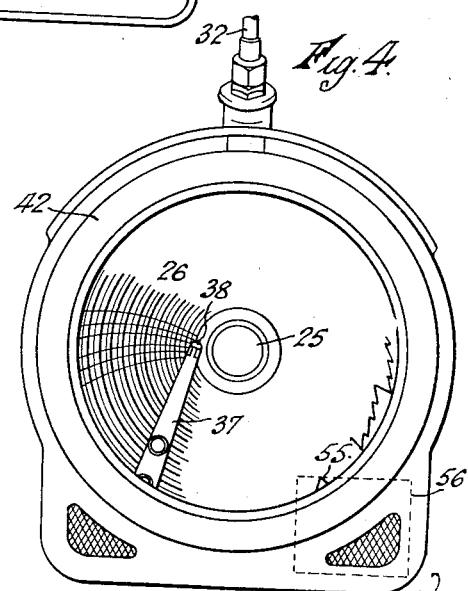
Figure 4 is a view of a modification.

Figure 4 illustrates an arrangement in which the periphery of the chart is marked by a marking device 55 which is actuated at regular intervals by a clock indicated at 56.

Figure 2:
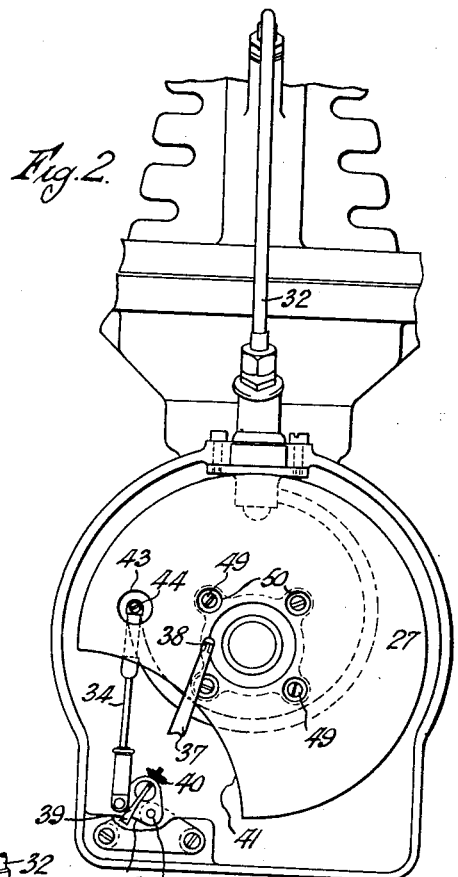
Figure 3:
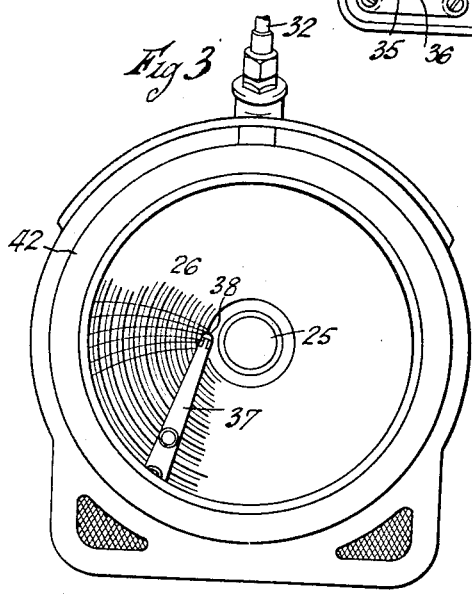
Figure 5:
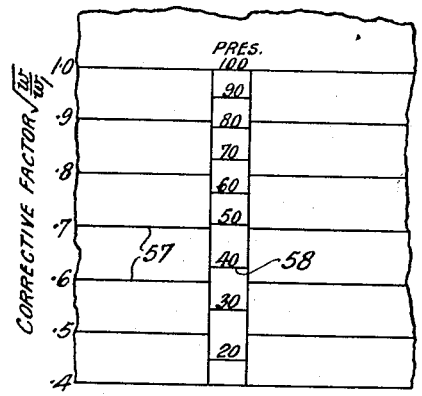
Figures 5 and 6 illustrate two types of chart to be used with flow meters embodying the invention.
Figure 6:
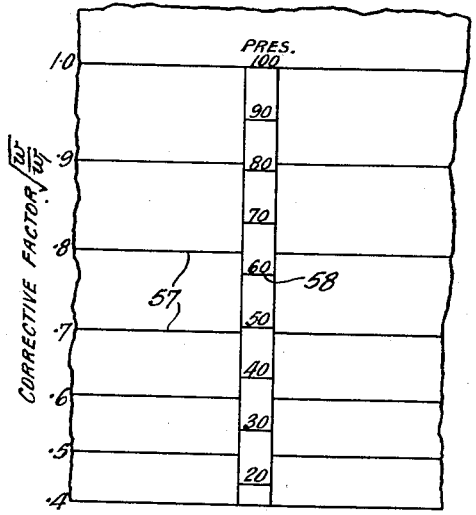

Referring now to Figures 5 and 6, these figures illustrate two types of chart which can be employed. For use with the type shown in Figure 5, the parts of the linkage comprising the pen actuating mechanism are so proportioned and located relative to each other that the pen is displaced from its zero position through distances which decrease in accordance with a fixed law in response to equal increments in pressure change and through a distance proportional to the corrective factor corresponding to the pressure causing movement of the pen, the corrective factor lines indicated at 57 thereby being equally spaced and therefore easily averaged. Referring to Figure 2, it will be seen that the end of the Bourdon tube 44 moves through equal distances for equal increments of pressure and that owing to the initial angle of the crank 35 being suitably positioned, the pen point 38 moves through an angle which diminishes for each equal movement of the end of the Bourdon tube 44. For use with the type of chart shown in Figure 6 wherein the corrective factor lines are unequally spaced, the mechanism for actuating the pen is such that the pen is displaced through a distance directly proportional to pressure.

The charts may also be provided with pressure lines 58.

It will be seen that in operation an indication is given on the chart of the values of the pressure corrective factor which existed while a certain flow occurs. Thus the true total flow can be ascertained by finding the mean value of this pressure corrective factor from the chart and multiplying the flow which is registered by the counter thereby correcting any variations in pressure which may have occurred.

Alternatively, the true total flow can be obtained by integrating the diagram on the chart.

The provision of the clock actuated marking device 55, while enabling the total flow passed during a given period to be ascertained from the record, also allows the mean rate of flow during one or more time intervals to be ascertained. It also provides for the reading-off of the pressure obtaining at different times.

It will be seen that with the construction described the parts are easily erected and taken apart when necessary.

What I claim is:—

1. In a gas flow meter, the combination of a casing adapted to be connected in a flow line; means in fixed relation to said casing defining a damping chamber in communication with said flow line; a turbine spindle mounted for rotation in said casing and extending into said damping chamber; a turbine wheel connected to said spindle within said casing and being rotatable in response to flow of gas through the casing; a quantity of damping fluid of approximately constant density in said damping chamber; a damping element in said chamber and connected to said spindle; a pressure recorder including a movable chart carrier, a marking device and a pressure responsive element operatively connected to said marking device; means providing communication between said pressure responsive element and said chamber; and means operatively connecting said spindle with said chart carrier for driving the latter.

2. In a gas flow meter, the combination of a casing adapted to be connected in a flow line; means in fixed relation to said casing defining a damping chamber in communication with said flow line; a turbine spindle mounted for rotation in said casing and extending into said damping chamber; a turbine wheel connected to said spindle within said casing and being rotatable in response to flow of gas through the casing; a quantity of damping fluid of approximately constant density in said damping chamber; a damping element in said chamber and connected to said spindle; a pressure recorder including a movable chart carrier, a marking device and a pressure responsive element operatively connected to said marking device; means providing communication between said pressure responsive element and said chamber; means operatively connecting said spindle with said chart carrier for driving the latter; a chart mounted on said chart carrier and being marked with indicia of different corrective factors corresponding to different pressures, by which factors the count registered by said counter must be multiplied in order to ascertain the true amount of fluid which has flowed during the registration of such count.

JOHN LAWRENCE HODGSON.